United States Patent
Xiao et al.

(10) Patent No.: US 9,406,960 B2
(45) Date of Patent: Aug. 2, 2016

(54) ENERGY STORAGE SYSTEMS HAVING AN ELECTRODE COMPRISING $Li_xS_y$

(75) Inventors: Jie Xiao, Richland, WA (US); Jiguang Zhang, Richland, WA (US); Gordon L. Graff, West Richland, WA (US); Jun Liu, Richland, WA (US); Wei Wang, Kennewick, WA (US); Jianming Zheng, Richland, WA (US); Wu Xu, Richland, WA (US); Yuyan Shao, Richland, WA (US); Zhenguo Yang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1032 days.

(21) Appl. No.: 13/432,166

(22) Filed: Mar. 28, 2012

(65) Prior Publication Data

US 2013/0260204 A1    Oct. 3, 2013

(51) Int. Cl.
*H01M 8/18* (2006.01)
*H01M 4/525* (2010.01)
(Continued)

(52) U.S. Cl.
CPC .............. *H01M 8/188* (2013.01); *H01M 4/525* (2013.01); *H01M 8/20* (2013.01); *H01M 12/08* (2013.01); *H01M 4/485* (2013.01); *H01M 4/505* (2013.01); *H01M 4/58* (2013.01); *H01M 4/5815* (2013.01);
(Continued)

(58) Field of Classification Search
CPC .......... H01M 2/08; H01M 2300/0025; H01M 2300/0028; H01M 4/485; H01M 4/505; H01M 8/188; H01M 8/20; H01M 12/08; H01M 4/5815; Y02E 60/528

USPC .......................................................... 429/105
See application file for complete search history.

(56) References Cited

U.S. PATENT DOCUMENTS 4,469,761 A * 9/1984 Bennett ................. H01M 10/36
                                                              429/104
6,210,832 B1 4/2001 Visco
(Continued)

FOREIGN PATENT DOCUMENTS

| CN | 1992420 | 7/2007 |
|----|---------|--------|
| CN | 102315473 | 1/2012 |
| WO | WO2009/151639 | 12/2009 |

OTHER PUBLICATIONS

Lu, Yahao, et al., "Rechargeable alkali-ion cathode-flow battery," Journal of Materials Chemistry, Jan. 20, 2011, The Royal Society of Chemistry, Austin, TX, USA.
(Continued)

*Primary Examiner* — Jonathan Jelsma
(74) *Attorney, Agent, or Firm* — Klarquist Sparkman, LLP

(57) ABSTRACT

Improved lithium-sulfur energy storage systems can utilizes $Li_xS_y$ as a component in an electrode of the system. For example, the energy storage system can include a first electrode current collector, a second electrode current collector, and an ion-permeable separator separating the first and second electrode current collectors. A second electrode is arranged between the second electrode current collector and the separator. A first electrode is arranged between the first electrode current collector and the separator and comprises a first condensed-phase fluid comprising $Li_xS_y$. The energy storage system can be arranged such that the first electrode functions as a positive or a negative electrode.

20 Claims, 2 Drawing Sheets

(51) Int. Cl.
  H01M 8/20 (2006.01)
  H01M 12/08 (2006.01)
  H01M 4/58 (2010.01)
  H01M 4/485 (2010.01)
  H01M 4/505 (2010.01)

(52) U.S. Cl.
  CPC ........... *H01M 2300/0025* (2013.01); *H01M 2300/0028* (2013.01); *Y02E 60/122* (2013.01); *Y02E 60/528* (2013.01)

(56) References Cited

U.S. PATENT DOCUMENTS

| | | |
|---|---|---|
| 2005/0042503 A1 | 2/2005 | Kim et al. |
| 2006/0194115 A1 | 8/2006 | De Jonghe et al. |
| 2006/0234126 A1 | 10/2006 | Kolosnitsyn et al. |
| 2007/0154810 A1 | 7/2007 | Kim et al. |
| 2010/0047671 A1 | 2/2010 | Chiang et al. |
| 2011/0027624 A1* | 2/2011 | Deane et al. ............... 429/49 |
| 2011/0200848 A1* | 8/2011 | Chiang et al. ............... 429/4 |
| 2012/0315545 A1* | 12/2012 | Son et al. ............... 429/246 |
| 2013/0059177 A1* | 3/2013 | De Jonghe et al. ............ 429/51 |

OTHER PUBLICATIONS

Duduta, Mina!, et al., "Semi-Solid Lithium Rechargeable Flow Battery," Advanced Energy Materials, Apr. 18, 2011, Wiley, Cambridge, MA, USA.

International Search Report and Written Opinion for International Application No. PC/US2012/058402, International Filing Date Oct. 2, 2012, Date of Mailing Feb. 15, 2013.

Extended Search Report for EP12872738.5 (mailed Oct. 8, 2015).

Office Action from Chinese Patent Office for Chinese Patent Application No. 201280071088.5, mailed Dec. 7, 2015.

\* cited by examiner

ENERGY STORAGE SYSTEMS HAVING AN ELECTRODE COMPRISING $Li_xS_y$

STATEMENT REGARDING FEDERALLY SPONSORED RESEARCH OR DEVELOPMENT

This invention was made with Government support under Contract DE-AC0576RLO1830 awarded by the U.S. Department of Energy. The Government has certain rights in the invention.

BACKGROUND

Lithium sulfur energy storage systems can have an energy density up to 2300 Wh/kg, which is well beyond that of conventional Li-ion batteries. However, practical application of Li—S batteries is still limited by several challenges that result in severe self-discharge and loss of active S, which often results in poor cycling and/or shelf-life. Therefore, a need for improved high energy density lithium sulfur energy storage systems exists.

SUMMARY

This document describes an energy storage system that utilizes $Li_xS_y$ as a component in an electrode of the system. In one embodiment, the energy storage system can comprise a first electrode current collector, a second electrode current collector, and an ion-permeable separator separating the first and second electrode current collectors. A second electrode is arranged between the second electrode current collector and the separator. A first electrode is arranged between the first electrode current collector and the separator and comprises a first condensed-phase fluid comprising $Li_xS_y$.

As used herein, a condensed-phase fluid can include a flowable material that is substantially not in the vapor phase. Examples can include, but are not limited to, liquids, liquid solutions, solids, and mixtures of liquids and solids, such as suspensions, slurries, emulsions, micelles, and gels. However, embodiments of the present invention do not necessarily exclude the presence of small amounts of vapor, which may exist, for example, in equilibrium with the condensed-phase fluid or as a minor reaction product during operation of the energy storage device.

Conventionally, an electrode can refer to a solid material comprising an active material, an electrically conductive material, an additive binder, and a current collector. At times, electrode can also be used in such a way as to include electrically conductive additives and a binder. In flow batteries, the active material is a fluid and can be flowed and/or replaced. The active material is traditionally referred to as being part of the electrolyte. A current collector is in electrical contact with the electrolyte and active material. As used herein, the electrode typically refers to the active material regardless of physical state. For example, the active material is referred to as the electrode if it is dissolved in the electrolyte or is present in a solid phase. Unless dictated by context, electrode does not necessarily refer also to the current collector, electrically conductive additives, or binder. Furthermore, given that this document includes descriptions of primary and secondary cells, the electrodes are referred to as being positive and negative for clarity and to avoid the fixed connotations of the terms cathode, anode, catholyte, and anolyte.

In preferred embodiments, sulfur is an electrochemically active species in the energy storage system and is not merely an element in an intercalation, storage, or conversion compound. As used herein, an electrochemically active species refers to a material which changes its oxidation state during an electrochemical reaction. In some embodiments, with regard to $Li_xS_y$, y is from approximately 1 to approximately 8. Preferably, y is from approximately 3 to approximately 8. In some embodiments x is from zero to approximately 4. For example, the first condensed-phase fluid can be a liquid solution comprising soluble $Li_xS_y$. Alternatively, the first condensed-phase fluid can be a suspension comprising insoluble $Li_xS_y$, wherein x is from zero to approximately 4.

In some embodiments, the energy storage device can comprise a liquid electrolyte and a solid-phase sulfur species located on the first-electrode side of the separator. The $Li_xS_y$ can be a reaction product of the solid-phase sulfur species and the liquid electrolyte. In one example, the solid-phase sulfur species can comprise particles embedded in a solid matrix material. In a particular embodiment, the solid matrix material can comprise carbon. Examples of solid matrix materials can include, but are not limited to, carbon felts, Ketjenblack, graphene, and other porous carbon materials. According to one embodiment, the solid matrix can also function as the first electrode current collector.

The second electrode can be a stationary electrode. Alternatively, it can comprise a second condensed-phase fluid. In preferred embodiments, the second electrode can comprise lithium. The second electrode can comprise a lithium intercalation material, a lithium conversion material, or both.

In one embodiment, the energy storage systems can be configured to operate such that the first electrode current collector and the first electrode are positive, and the second electrode current collector and second electrode are negative. The second electrode, in such instances, can comprise lithium intercalation or conversion compounds having an electrochemical potential lower than that of $Li_xS_y$. Examples can include, but are not limited to, Li, $Li_4Ti_5O_{12}$, $Li_xVO_y$ (3>x>1), $LiC_x$ (6>x), $Li_xSi$ (4>x>0.5), $Li_xS_y$ (4>x>0.5), $Co_3O_4$, $MnO_2$, $Fe_3O_4$, NiO, $MoO_3$, and other transition metal oxides. The second electrode can comprise a carbonaceous material. Examples can include, but are not limited to, graphite, soft carbon, and graphene.

In an alternative embodiment, the energy storage systems can be configured to operate such that the first electrode current collector and the first electrode are negative, and the second electrode current collector and the second electrode are positive. The second electrode, in such instances, can comprise lithium intercalation or conversion compounds having an electrochemical potential higher than that of $Li_xS_y$. Examples can include, but are not limited to $LiFePO_4$, $LiCoO_2$, $LiMn_2O_4$, $LiNi_2O_4$, $LiCo_2O_4$, and $LiNi_{0.5}Mn_{1.5}O_4$. Composite materials can also be suitable. One example includes $xLi_2MnO_3\cdot(1-x)LiMO_2$, wherein M=Mn, Ni, Co and combinations thereof, x=0.3-0.6.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Figure 1:
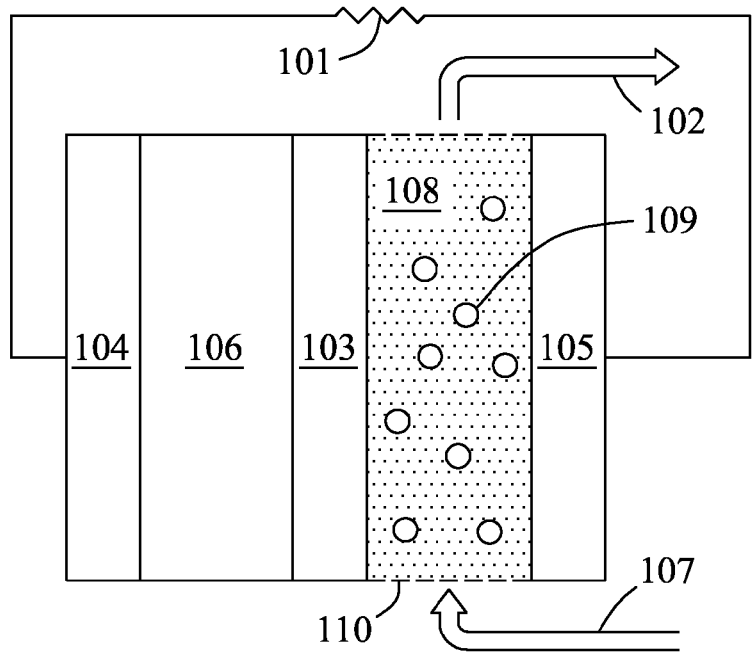
FIG. 1 is a diagram depicting an energy storage system having a first condensed-phase fluid as a first electrode and a stationary electrode as a second electrode according to embodiments of the present invention.

FIGS. 1-4 depict a variety of aspects and embodiments of the present invention. Referring first to FIG. 1, a diagram depicts one embodiment in which a first electrode is disposed between a first electrode current collector 105 and an ion-permeable separator 103. The first electrode is a condensed-phase fluid 108 comprising $Li_xS_y$ 109. In one embodiment, the $Li_xS_y$ can be soluble in a condensed-phase fluid that is a liquid solution. In another embodiment, the $Li_xS_y$ can be insoluble in a condensed-phase fluid that is a suspension. Alternatively, the $Li_xS_y$ can be coated on sulfur particles in a suspension composing the first condensed-phase fluid. The second electrode 106 is a stationary electrode disposed between a current collector 104 and the ion-permeable separator 103. Redox reactions occurring at the first and second electrodes can result in transfer of electrons to an operably connected load 101 as well as ion transfer across the ion-permeable separator. The condensed-phase fluid can flow from a source 107, through an electrode area 110, to an exit 102. One example of the source 107 is a storage tank containing fresh condensed-phase fluid. The condensed-phase fluid exiting the electrode area can, for example, be recycled to the storage tank. Alternatively, it can be stored in a separate spent fluid storage tank.

Figure 2:
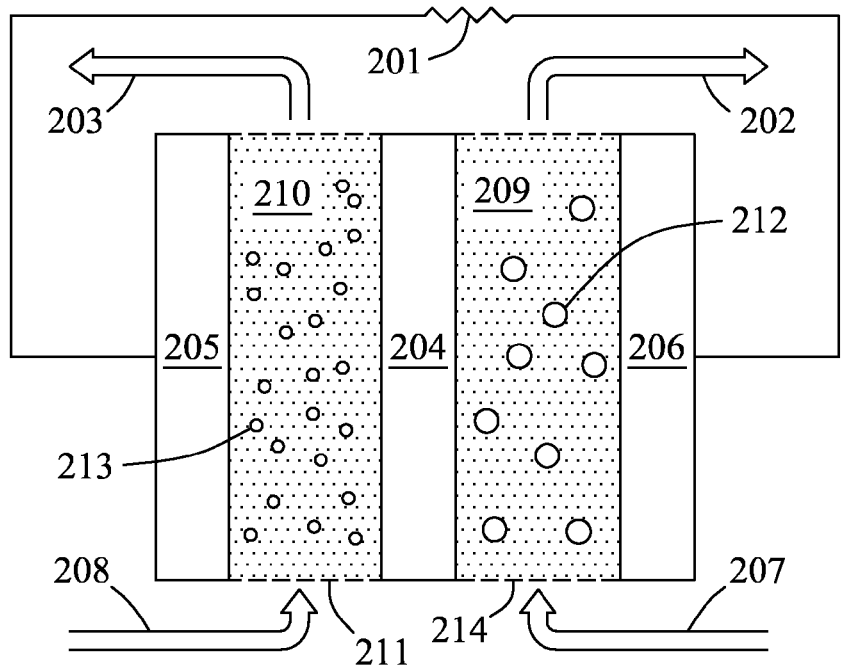
FIG. 2 is a diagram depicting an energy storage system having condensed-phase fluids for the first and second electrodes according to embodiments of the present invention.

In another embodiment, referring to FIG. 2, the first electrode is a first condensed-phase fluid 209 comprising $Li_xS_y$ 212 and the second electrode is a second condensed-phase fluid 210 comprising lithium, a lithium intercalation material, a lithium conversion material, or combinations thereof 213. Ion-permeable separator 204 separates the first and second electrodes. Redox reactions occurring at the electrodes can result in the transfer of electrons through first and second electrode current collectors 206 and 205, respectively, and to an operably connected external load 201. Transfer of ions occurs across the separator 204 to maintain charge balance. The first and second condensed-phase fluids (209 and 210, respectively) can flow from sources (207 and 208, respectively), through first and second electrode areas (214 and 211, respectively), to exits (202 and 203, respectively). The flow can be operated continuously or in a batch or semi-batch manner. Furthermore, the cell potential can be reversed to operate in a charge or discharge mode.

Figure 3:
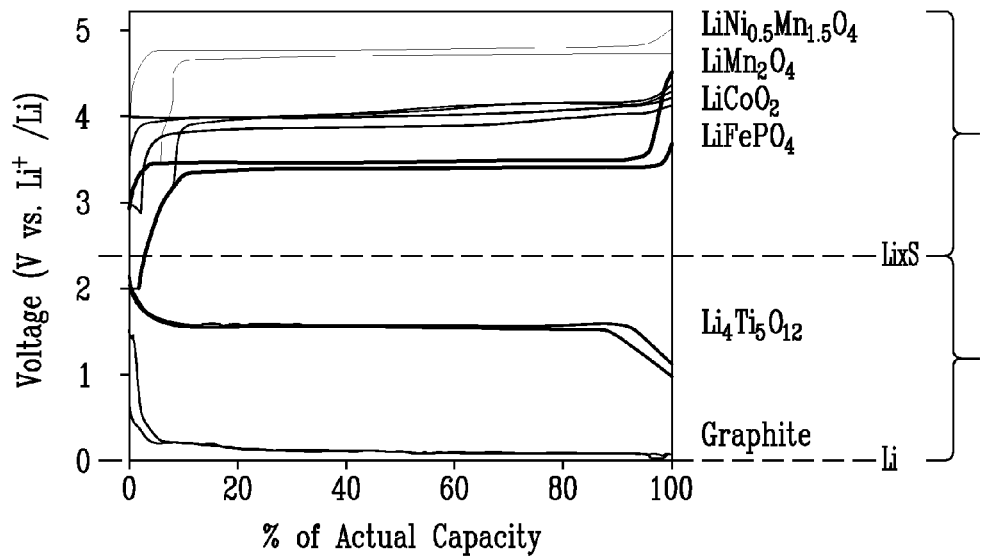
FIG. 3 is a graph of the relative voltages for a variety of examples of suitable cell configurations for when the first electrode is operated as a cathode or an anode.

The energy storage systems described herein can be operated in two different configurations. The first electrode comprising $Li_xS_y$ can be operated as a positive electrode (i.e., cathode) or a negative electrode (i.e., anode). When operated as a cathode, the second electrode comprises a material having an electrochemical potential less than that of $Li_xS_y$. Alternatively, when operated as an anode, the second electrode comprises a material having an electrochemical potential greater than that of $Li_xS_y$. Referring to FIG. 3, a graph of voltage as a function of capacity indicates a variety of examples of suitable compounds for when the first electrode is operated as a cathode or anode. Second electrodes comprising compounds listed above the $Li_xS_y$ dotted line are indicative of energy storage systems in which the first electrode functions as an anode during discharge. Second electrodes comprising compounds listed below the $Li_xS_y$ dotted line are indicative of energy storage systems in which the first electrode functions as a cathode during discharge. The materials listed in FIG. 3 are included as examples for illustrative purposes. Embodiments of the present invention are not limited to those shown.

According to one embodiment, the second electrode is an anode and comprises Li. For first electrodes comprising a liquid solution, wherein the $Li_2S_y$ is soluble, multiple electron transfer can occur. In such embodiments, the redox chemistry of the energy storage system can be represented by Equation 1 below, wherein the cathode comprises sulfur.

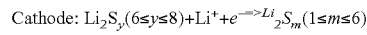

Cathode: $Li_2S_y(6 \leq y \leq 8) + Li^+ + e^- \Rightarrow Li_2S_m(1 \leq m \leq 6)$

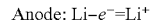

Anode: $Li - e^- = Li^+$          Equation 1

While y can be between approximately 1 and approximately 8, for y values between 3 and 8, the $Li_2S_y$ tends to be soluble in most organic solvents. Different compositions can correspond to different discharge products that form at different depths of discharge. Depending on operating parameters, different x and y values will be associated with different capacities and operation voltages. For example, if only soluble polysulfide is preferred in a device, then the voltage window might be between 2.2 V and 3.0 V because above 2.1 V the precipitation of solid discharge products ($Li_2S_2$, and/or $Li_2S$) will typically not have occurred.

In general, solube polysulfide species, including $Li_2S_8$, $Li_2S_6$, $Li_2S_4$, $Li_2S_3$ will be formed first during the discharge process of Li—S batteries. Even if the discharge process is stopped at 2.1V, these soluble polysulfides can penetrate the separator and diffuse into the anode, or negative electrode volume, then react with lithium to form insoluble $Li_2S_2$ and $Li_2S$. In some embodiments, these soluble polysulfides (including $Li_2S_8$, $L_2S_6$, $Li_2S_4$, $Li_2S_3$) are pumped out of the cathode, or positive electrode volume, before they can diffuse to the anode, or negative electrode volume, to form insoluble $Li_2S_2$ and $Li_2S$.

In some embodiments, a condensed-phase fluid comprising $Li_2S_y$ can be prepared from soluble polysulfides. For example, in a conventional electrolyte comprising 1 M lithium bis(trifluoromethane)sulfonamide (LiTFSI) in a mixture of 1,3-dioxolane (DOL) and dimethyoxyethane (DME) (1:1 by volume) for Li—S batteries, polysulfides can form in-situ during discharge and flow out through the current collector. In another example, polysulfide can be formed chemically by the reaction of $Li_2S$ and $S_8$ in certain basic aprotic organic solvents, such as tetrahydrofuran (THF) or dimethyl sulfoxide (DMSO). The reaction can be described by the equation $(2n/m-1)Li+S_y^{2-}=(n/m)S_m^{2-}+(2n/m-1)Li^+$. A supporting electrolyte comprising $LiAsF_6$ can be dissolved in THF first. A stoichiometric amount of sulfur and $Li_2S$ can be added to the $LiAsF_6$-THF solution to form $Li_2S_y$ solutions of the required concentration and average polysulfide chain length. The reaction and dissolution is usually completed after 24 hrs.

In other embodiments, the condensed-phase fluid comprising $Li_xS_y$ can be prepared in-situ (i.e., during or after assembly of an energy storage system) from a solid-phase sulfur species. For example, a sulfur-containing electrode/current collector can be prepared, which will yield a carbon current collector and condensed-phase fluid comprising $Li_2S_y$ when operated (i.e., during first discharge) in an energy storage system according to embodiments of the present invention. Preparation of the electrode involves dissolving sulfur in carbon disulfide to yield a solution into which carbon felt is immersed. The felt is removed, dried, and heat treated to yield a carbon felt having solid sulfur embedded on surfaces and pores of the felt. An example of a heat treatment is heating at 155° C. for 12 hours in argon. The condensed-phase fluid comprising $Li_xS_y$ can be formed in situ by arranging the sulfur-containing electrode/current collector into an energy storage system. Addition of a liquid electrolyte that reacts with the embedded sulfur to form $Li_xS_y$ results in a condensed-phase fluid electrode, while the carbon felt functions as a current collector.

Figure 4:
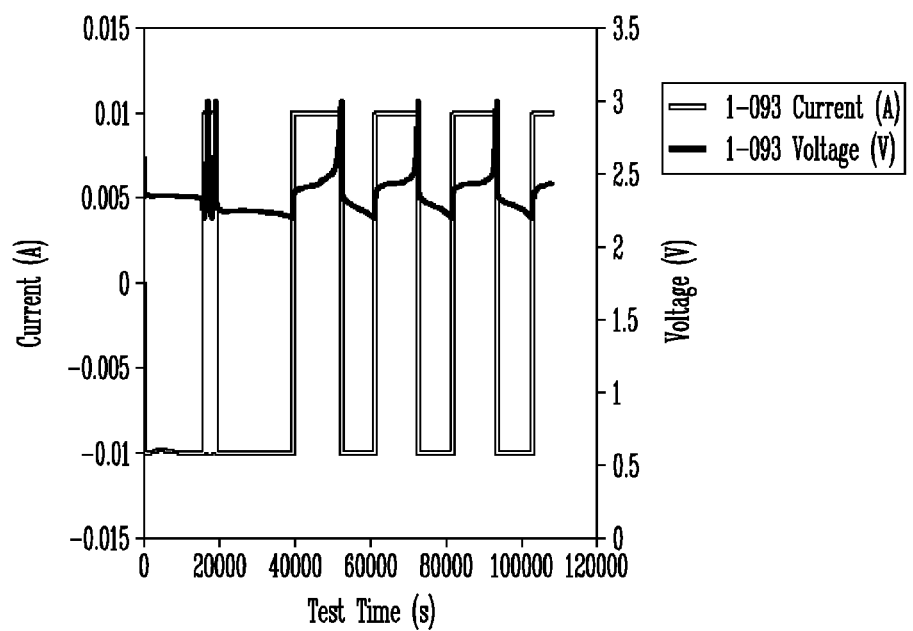
FIG. 4 is a graph presenting cycling data for an energy storage system according to one embodiment of the present invention.

Referring to FIG. 4, a graph containing cycling data for an energy storage system is shown according to one embodiment of the present invention. The energy storage system comprised a carbon felt having sulfur embedded on surfaces and pores of the felt and was prepared as described above. After addition of 1M LiTFSI in DOL/DME as an electrolyte, discharge reaction between the solid sulfur and the lithium yielded a condensed-phase fluid solution comprising soluble $Li_xS_y$, wherein the solution is arranged as a positive electrode. In particular, the positive electrode comprised $Li_2S_y$. The carbon felt then served as a positive electrode current collector. The negative electrode comprised lithium metal and a current collector. The area of each electrode was 10 cm². The current density was 1 mA/cm² and the voltage window ranged from 2.2 V to 3 V. The cycling data show that the present embodiment exhibits stable operation and typical charge-discharge curves of long chain polysulfides. Cycling ability is also observed indicating that the as-designed flowing device is rechargeable.

Similarly, an electrode comprising a sulfur-containing suspension, or other non-solution condensed-phase fluid, can yield an intermediate discharge sulfur product that is soluble. For example, S and $Li_2S$ can be dissolved in THF containing $LiAsF_6$ to yield a liquid solution electrode when a voltage is applied.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. An energy storage system comprising:
   a lithium-sulfur redox flow energy storage system comprising a first fluid inlet and a first fluid outlet connectable to a fluid supply tank, a first electrode current collector, a second electrode current collector, an ion-permeable separator separating the first and second electrode current collectors, a second electrode between the second electrode current collector and the separator, a first electrode between the first electrode current collector and the separator, and wherein the first electrode comprises a first condensed-phase fluid comprising $Li_xS_y$, wherein x is from about 0 to about 4 and y is from about 1 to about 8, wherein the first condensed-phase fluid can flow in through the first fluid inlet and out through the first fluid outlet; and
   wherein the first electrode current collector and first electrode are negative, and the second electrode current collector and second electrode are positive.

2. The energy storage system of claim 1, herein the second electode is a stationary electrode.

3. The energy storage system of claim 1, further comprising a second fluid inlet and a second fluid outlet connectable to a fluid supply tank, wherein the second electrode comprises a second condensed-phase fluid which second condensed-phase fluid can flow in through the second fluid inlet and out through the second fluid outlet.

4. The energy storage system of claim 3, wherein the second condensed-phase fluid comprises a solution.

5. The energy storage system claim 3, wherein the second condensed-phase fluid comprises a suspension.

6. The energy storage system of claim 1, wherein the second electrode comprises lithium.

7. The energy storage system of claim 1, wherein the second electrode comprises a lithium intercalation material, a lithium conversion material, or both.

8. The energy storage system of claim 1, wherein y is from approximately 3 to approximately 8.

9. The energy storage system of claim 1, wherein x is from approximately 2 to approximately 4.

10. The energy storage system of claim 1, wherein y is from approximately 6 to approximately 8.

11. The energy storage system of claim 1, wherein sulfur is an electrochemically active species.

12. The energy storage system of claim 1, herein the first condensed-phase fluid is a solution comprising soluble $Li_xS_y$.

13. The energy storage system of claim 1, wherein the first condensed-phase fluid is a suspension comprising insoluble $Li_xS_y$.

14. The energy storage system of claim 1, further comprising a solid-phase sulfur species located on a first-electrode side of the separator and a liquid electrolyte, wherein the $LixS_y$ is a reaction product of the solid-phase sulfur species and the liquid electrolyte.

15. The energy storage system of claim 14, wherein the solid-phase sulfur species comprise particles embedded in a solid matrix material.

16. The energy storage of claim 15, wherein the solid matrix material comprises carbon.

17. The energy storage system of claim 15, wherein the solid matrix material functions as the first electrode current collector.

18. An energy storage system comprising:
a Li—S redox flow energy storage device comprising a first electrode current collector, a second electrode current collector, an ion-permeable separator separating the first and second electrode current collectors, a second electrode between the second electrode current collector and the separator, and a first electrode between the first electrode current collector and the separator, wherein the first electrode comprises a flowable liquid comprising soluble $Li_xS_y$ ($1 \leq x \leq 4$ and $1 \leq y \, 8$), wherein sulfur is an electrochemically active species; and
wherein the first electrode current collector and first electrode are negative, and the second electrode current collector and second electrode are positive.

19. The energy storage system of claim 18, wherein the second electrode comprises Li.

20. The energy storage system of claim 18, wherein the second electrode comprises a lithium intercalation material, a lithium conversion material, or both.

* * * * *